United States Patent [19]

Wakatsuki et al.

[11] Patent Number: 5,008,665
[45] Date of Patent: Apr. 16, 1991

[54] MEASURING DEVICE HAVING TRANSMITTER

[75] Inventors: Yoshio Wakatsuki; Toshiharu Okuyama; Hajime Takeuchi; Misao Shimizu; Giichiro Shimizu, all of Tokyo, Japan

[73] Assignee: Man Design Co. Ltd., Tokyo, Japan

[21] Appl. No.: 569,534

[22] PCT Filed: Apr. 15, 1988

[86] PCT No.: PCT/JP88/00377

§ 371 Date: Dec. 14, 1988

§ 102(e) Date: Dec. 14, 1988

[87] PCT Pub. No.: WO88/08184

PCT Pub. Date: Oct. 20, 1988

Related U.S. Application Data

[63] Continuation of Ser. No. 290,414, Dec. 14, 1988, abandoned.

[30] Foreign Application Priority Data

Apr. 16, 1987 [JP] Japan .................................. 62-56703

[51] Int. Cl.$^5$ .............................................. G08C 19/00
[52] U.S. Cl. .............................. 340/870.26; 340/539; 455/121
[58] Field of Search .............. 340/870.01, 870.07, 340/870.16, 870.17, 870.26, 539, 540; 343/702, 703, 873; 455/121

[56] References Cited

U.S. PATENT DOCUMENTS

| 4,123,756 | 10/1978 | Nagata et al. | 343/702 |
| 4,435,713 | 3/1984 | Gasparaitis et al. | 343/702 |
| 4,800,392 | 1/1989 | Garay et al. | 343/702 |
| 4,827,272 | 5/1989 | Davis | 340/870.17 |

FOREIGN PATENT DOCUMENTS 46-10576 4/1971 Japan .
46-33163 10/1971 Japan .
59-167796 9/1984 Japan .

Primary Examiner—Parshotam S. Lall
Assistant Examiner—Tyrone Queen
Attorney, Agent, or Firm—Nixon & Vanderhye

[57] ABSTRACT

A measuring device having a transmitter includes a measuring device section, a data processing unit, a transmitter, and a casing. The measuring device section converts measuring data into a digital value and outputs it. The data processing unit arranges the measurement data obtained in the measuring device section in a transmission data string having a predetermined format and outputs it. The transmitter transmits the transmission data, which is output from the data processing unit, by radio transmission. The transmitter is housed in the casing, which is attached to a portion near an operation section of the measuring device section, together with the data processing unit. An antenna output terminal of the transmitter is connected to the casing or a conductor portion near the casing.

2 Claims, 4 Drawing Sheets

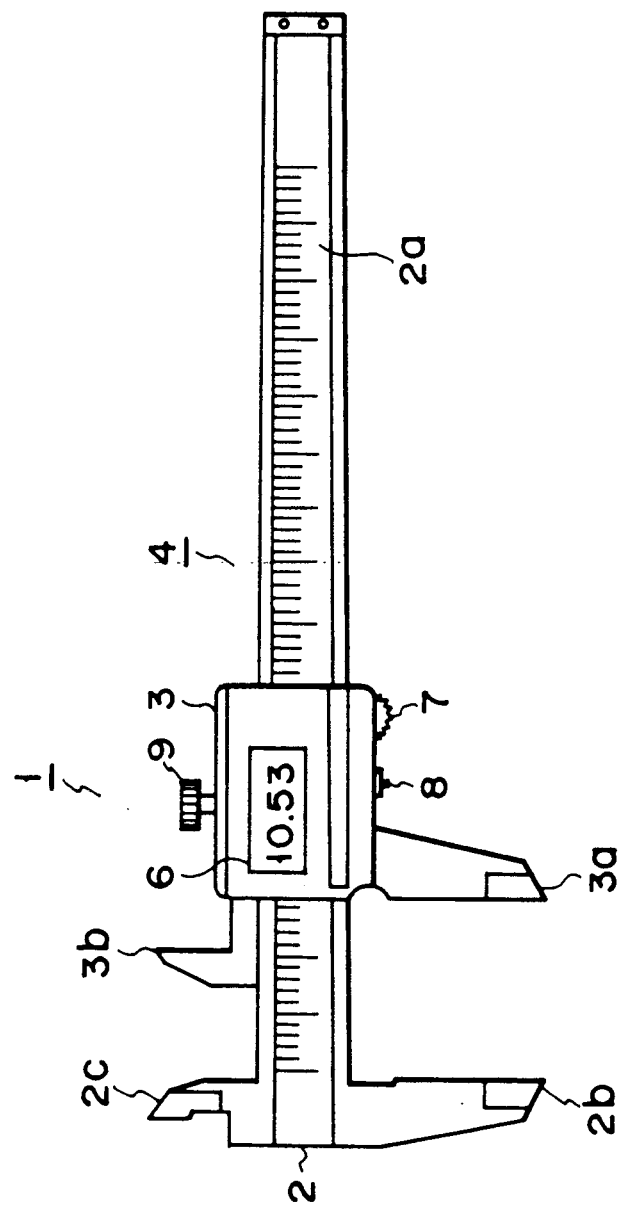
F I G. 2B
F I G. 2A

MEASURING DEVICE HAVING TRANSMITTER

This is a continuation of application Ser. No. 07/290,414, filed Dec. 14, 1988, now abandoned.

TECHNICAL FIELD

The present invention relates to a measuring device such as a vernier caliper and, more particularly, to a measuring device having a transmitter for arranging measurement data in a transmission data string having a predetermined format by using a data processing unit and performing radio transmission of the transmission data string to a host system by using the transmitter.

BACKGROUND ART

In a system, measurement data obtained by measuring an object to be measured using one or more portable measuring devices such as vernier calipers are collected in a host system installed at a place apart from the measuring devices so as to perform processing, such as totaling, of the measurement data. In this system, the measurement data in the measuring devices must be transmitted to the host system as accurately and efficiently as possible. A measuring device integrally incorporating a small data processing unit, e.g., a data processing unit constituted by a microcomputer, and a transmitter has been developed as a measuring device for transmitting measurement data in the measuring device to a host system as accurately and quickly as possible. According to such a measuring device having a transmitter, measurement data obtained in a measuring device section is edited by the data processing unit so as to be a transmission data string constituted by a data frame having a predetermined format, and the transmission data string is output by radio transmission using the transmitter. A receiver is incorporated in the host system side. The measurement data included in the data frame of the transmission data string is read by a host computer so as to perform totaling of the measurement data. When the measuring device section is connected to the host system by radio communication in this manner, measurement data can be transmitted to the host system in a real time manner without degrading operation efficiency during a measuring operation even if a portable measuring device, such as a vernier caliper or a micrometer, which is directly held and operated by an operator, is used as the measuring device.

In the measuring device having a transmitter, in which the data processing unit and the transmitted are arranged in the measuring device section in the above manner, however, the following problems are still left unsolved.

The data processing unit and the transmitter for transmitting the transmission data string, which is edited by the data processing unit, by radio transmission upon, e.g., frequency shift keying (FSK) of the transmission data string must be small in size and light in weight so as not to interfere with operability and portability of the measuring device section itself For this reason, the data processing unit and the transmitter are generally constituted by a certain number of IC semiconductor elements, and are housed in a single casing so as to be attached to the measuring device section. However, in the transmitter formed to be small and lightweight in this manner, since a transmission output of a radio wave cannot be set to be very high, an antenna having a relatively large length is required.

If, however, a long, nonflexible antenna such as a rod antenna is attached to the measuring device having a transmitter, the operability of the measuring device section is greatly degraded. In place of the rod antenna, a flexible antenna such as a vinyl-coated wire may be attached to the device. In this case however, since the operator's hands and arms may be tangled with the antenna when the measuring device section is operated, operability of the measuring device section is degraded like the rod antenna.

Consequently, in order to receive a low-power radio wave output from the transmitter attached to the measuring device section, the antenna of the receiver of the host system must be installed near a measurement site. If the receiving antenna is installed excessively near the measuring site, a measuring operation is also interfered.

The present invention has been made in consideration of such a situation, and has as its object to provide a measuring device having a transmitter, which incorporates a transmitter and has an antenna output terminal of the transmitter connected to a casing fixed to a measuring device section near its operation section so that signals output from the transmitter can be efficiently radiated in the air without installing a specific antenna outside the casing, and without degrading reliability of data transmission and operability of the measuring device section itself.

DISCLOSURE OF INVENTION

According to the present invention, there is provided a measuring device having a transmitter, comprising a measuring device section for outputting measurement data as a digital value, a data processing unit for arranging the measurement data output from the measuring device section in a transmission data string having a predetermined format and outputting the transmission data string, a transmitter for transmitting the transmission data string, which is output from the data processing unit, by radio transmission, and a casing, attached to a portion near an operation section of the measuring device section, for housing the data processing unit and the transmitter, the casing having a conductor arranged at least in a portion thereof, and an antenna output terminal of the transmitter being connected to the conductor.

According to the measuring device having a transmitter of the present invention arranged in the above-described manner, the antenna output terminal of the transmitter is connected to the conductor of the casing, attached to a portion near the operation section of the measuring device section, for housing the transmitter and the data processing unit. Therefore, a signal to be transmitted by radio transmission, which is output from the transmitter, is supplied to the conductor of the casing.

When, for example, an object to be measured is actually measured by this measuring device, an operator performs a measuring operation while holding the operation section of the measuring device section with his or her hand. Since the casing is arranged near the operation section, a signal supplied to the casing flows through the operator's body. As a result, the operator's body functions as an antenna so that the small-power signal output from the transmitter can be efficiently radiated in the air.

BRIEF DESCRIPTION OF DRAWINGS

FIGS. 2A and 2B are front and side views each showing an outer appearance of the measuring device having a transmitter according to the embodiment;

BEST MODE OF CARRYING OUT THE INVENTION

Figure 1:
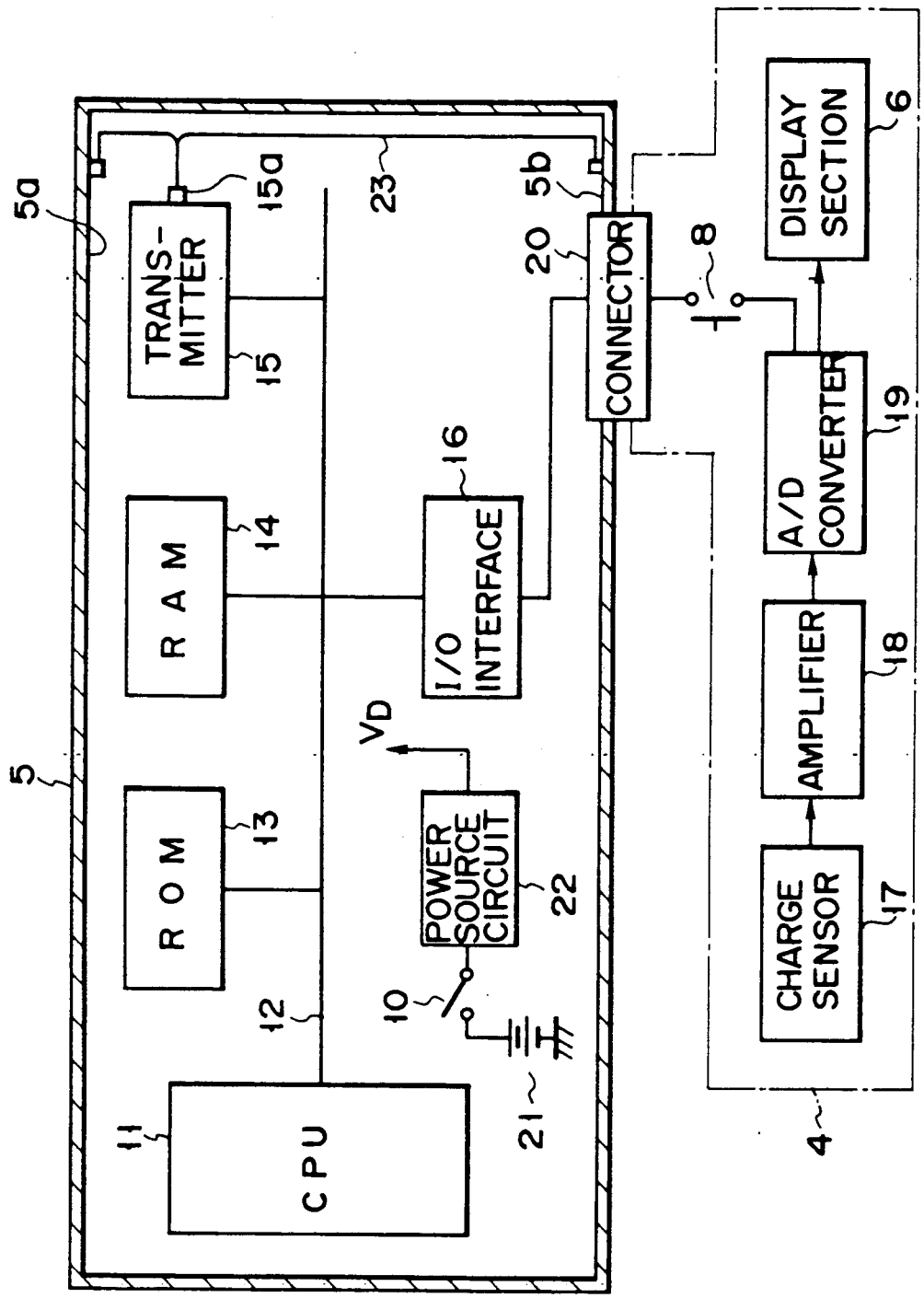
FIG. 1 is a schematic block diagram showing an arrangement of a main part of a measuring device having a transmitter according to an embodiment of the present invention.

An embodiment of the present invention will be described below with reference to the accompanying drawings.

FIGS. 2A and 2B are front and side views each showing a vernier caliper having a display section to which a measuring device having a transmitter of the present invention is applied. More specifically, measuring device 1 constituted by a vernier caliper comprises vernier caliper section 4, as a measuring device section, constituted by main scale 2 and slider 3 having a display section, and box-like casing 5 made of a conductive material, such as a metal, for housing a one-chip microcomputer, as a data processing unit, attached to the rear surface of slider 3, a transmitter, and the like. Scale mark 2a is arranged on main scale 2 of vernier caliper section 4. When the outer diameter of an object to be measured is measured, the distance between the opposite surfaces of outside jaws 2b and 3a of main scale 2 and slider 3 is measured. When the inner diameter of the object is to be measured, the distance between inside jaws 2c and 3b of main scale 2 and slider 3 is measured. Measurement data obtained by this measuring operation is digitally displayed on display section 6, e.g., a liquid crystal display element, attached to the front surface of slider 3 by using digits representing the numerical value of measurement result.

Transmission switch 8 constituted by a push-button switch is arranged near finger hook 7 of slider 3. Clamping screw 9 arranged on the upper surface of slider 3 is used to fix slider 3 to main scale 2.

Power switch 10 is arranged on the rear surface of casing 5 attached to the rear surface of slider 3.

FIG. 1 is a schematic block diagram showing an arrangement of the data processing unit, the transmitter, and a measuring section of vernier caliper section 4. ROM (read only memory) 14 for storing control programs and the like, RAM (random access memory) 13 as a read/write memory for temporarily storing input measurement data, transmitter 15 for transmitting by radio transmission a data string constituted by a data frame of a predetermined format in which the input measurement data is arranged, and I/0 (input/output) interface 16 to which the measurement data from vernier caliper section 4 is supplied are connected, through bus line 12, to CPU (central processing unit) 11 for executing various arithmetic operations of the measurement data supplied from vernier caliper section 4.

In vernier caliper section 4, data corresponding to a measurement value obtained by a capacitor embedded in a portion under scale mark 2a of main scale 2 and an electrode arranged in slider 3 is detected by charge sensor 17, and charge sensor 17 outputs a voltage signal corresponding to the measurement value. The analog DC measurement data output from charge sensor 17 is amplified by amplifier 18. The amplified signal is then converted into a digital value by A/D (analog-digital) converter 19, and is supplied to display section 6, thereby displaying the measurement value on display section 6. The measurement data converted into the digital value by A/D converter 19 is supplied to I/0 interface 16 of the data processing unit through transmission switch 8 and connector 20.

Note that gain adjustment and zero-point adjustment of amplifier 18 are performed so as to match measurement data converted by A/D converter 19 with an actual size.

Battery 21 is incorporated in casing 5 so that driving voltage VD is applied to each component of the electronic circuit through power switch 10 and power source circuit 22 attached to the rear surface of casing 5.

Antenna output terminal 15a of transmitter 15 is connected to inner upper and lower walls 5a and 5b of casing 5 through lead 23 by, e.g., soldering.

Figure 3:
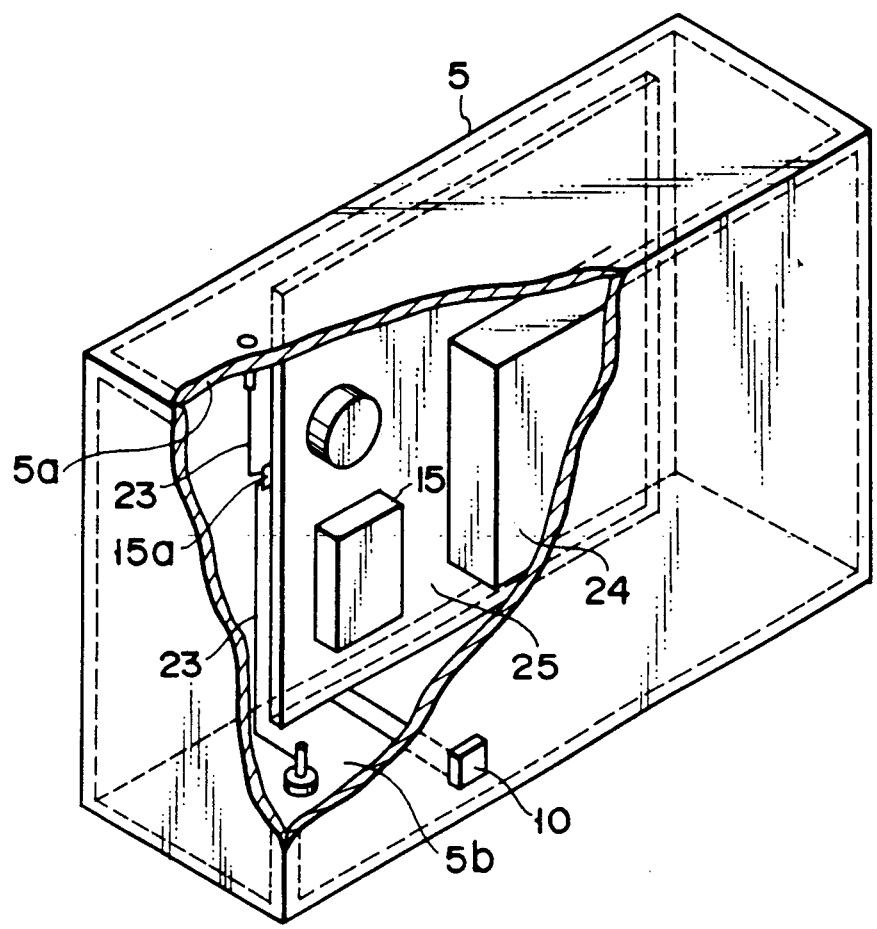
FIG. 3 is a partially cutaway perspective view of a casing in the embodiment.

FIG. 3 is a partially cutaway perspective view showing the interior of casing 5 attached to the rear surface of slider 3. As shown in FIG. 3, the data processing unit constituted by one-chip microcomputer 24 including CPU 11, ROM 13, and RAM 14, and PC (printed circuit) board 25 having transmitter 15 mounted thereon are housed in casing 5. Antenna output terminal 15a of transmitter 15 is attached to one end of PC board 25. Antenna output terminal 15a is connected to inner upper and lower walls 5a and 5b of casing 5 through lead 23.

Power switch 10 described above is arranged at a lower position of the rear surface of casing 5.

In measuring device 1 having a transmitter arranged in this manner, when power switch 10 is turned on, driving voltage VD is applied to each component of the electronic circuit including vernier caliper section 4. When driving voltage VD is applied to vernier caliper section 4, a digital value representing measurement data corresponding to a current size between outside jaws 2b and 3a is output from A/D converter 19 and is displayed on display section 6. Subsequently, the operator moves outside and inside jaw 3a and 3b of slider 3 while gripping scale mark 2a of main scale or slider 3 of vernier caliper section 4 and moving finger hook 7 of slider 3 by his thumb. When transmission switch 8 is operated while an object to be measured is properly clamped by outside jaws 2b and 3a, measurement data output from A/C converter 19 is supplied to I/O interface 16 of data processing unit 24 through transmission switch 8 and connector 20.

When the measurement data is input to I/O interface 16, CPU 11 temporarily stores the data in RAM 14. CPU 11 arranges the measurement data in a data frame of a predetermined format and edits a serial transmission data string. Upon completion of edition of the transmission data string in which the measurement data is arranged, CPU 11 supplies the transmission data string to transmitter 15.

Figure 4:
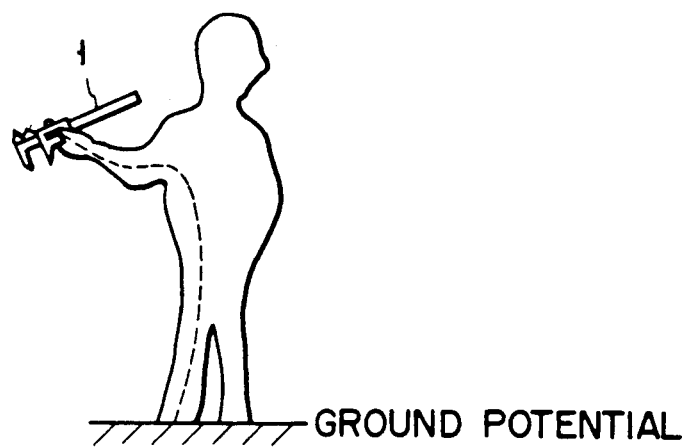
FIG. 4 is a view for explaining an operation of the measuring device having a transmitter according to the embodiment.

Transmitter 15 performs frequency shift keying (FSK) of the supplied transmission data string, and supplies it to antenna output terminal 15a as an FSK signal. The FSK signal supplied to antenna output terminal 15a is supplied to upper and lower walls 5a and 5b of casing 5 made of a conductive material through lead 23. On the other hand, if measuring device 1 is a vernier caliper having a display section as shown in FIG. 2B, since the thickness of slider 3 and casing 5 is very small compared with the width of a finger, the surface of casing 5 is always in contact with the operator's hand while the operator operates the device Therefore, antenna output terminal 15a of transmitter 15 in casing 5 is grounded through the operator's hand or body, as shown in FIG. 4. As a result, the FSK signal output from transmitter 15 flows to the ground through casing 5 and the operator's hand and body. In this case, the operator's hand and body functions as a kind of antenna.

The FSK signal output from transmitter 15 is efficiently radiated in the air as a radio wave through this antenna. The radio wave of the FSK signal radiated in the air is received by a receiver of a host system (not shown). The received FSK signal is demodulated into the original transmission data string and is supplied to a host computer. The host computer reads the measurement data in the supplied transmission data string, and performs predetermined data processing.

As described above, since an operator can function as an antenna by connecting antenna output terminal 15a of transmitter 15 to casing 5 arranged near the operation section which the operator always touch, an antenna need not be arranged separately unlike the conventional measuring device having a transmitter. Consequently, operability of vernier caliper section 4 as a measuring device section can be greatly improved.

In addition, since the FSK signal output from transmitter 15 can be efficiently radiated in the air from the antenna, the output of transmitter 15 need not be particularly increased. As a result, transmitter 15 itself can be formed into a small and lightweight device, and its power consumption can be suppressed. Therefore, transmitter 15 can be easily incorporated in a small, portable measuring device such as a vernier caliper.

Figure 5:
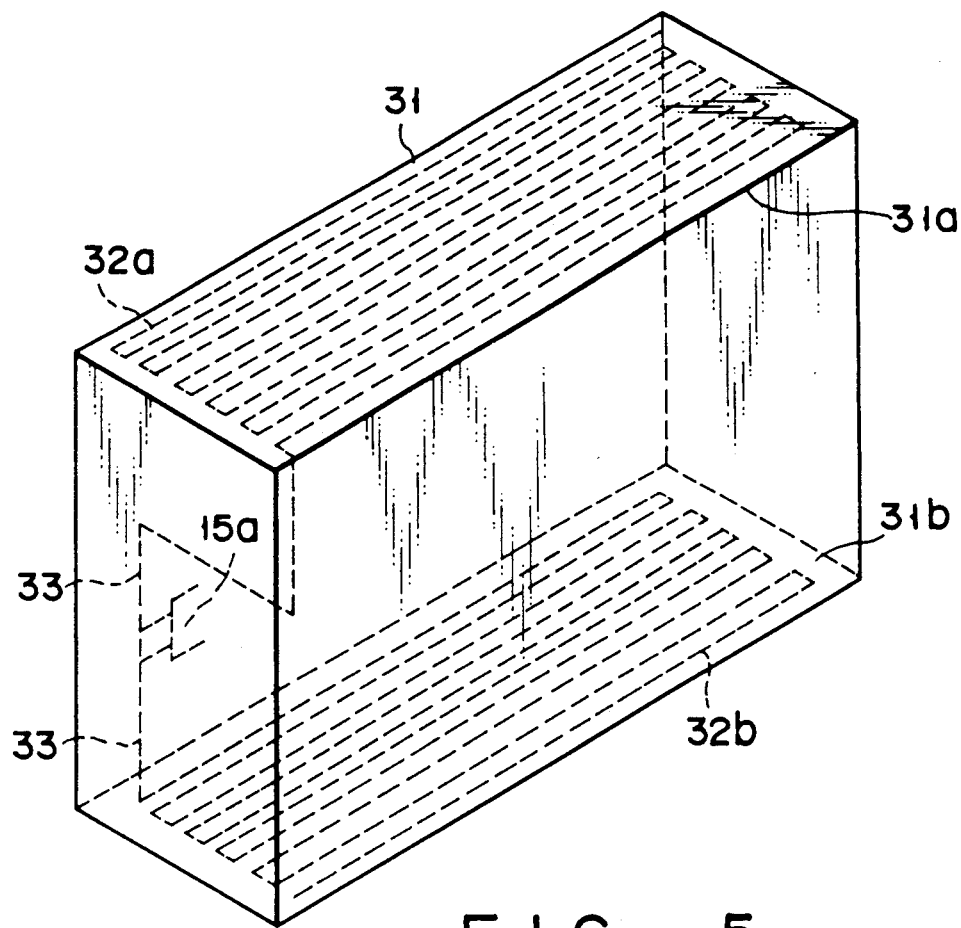
FIG. 5 is a perspective view showing an arrangement of a casing of a measuring device having a transmitter according to another embodiment of the present invention.

FIG. 5 is a perspective view showing casing 31 which is incorporated in a measuring device having a transmitter according to another embodiment of the present invention and is adapted to house a data processing unit and the transmitter. Case 31 is made of a dielectric material such as a plastic. Conductive sheets 32a and 32b constituting a conductor are respectively adhered to entire inner upper and lower walls 31a and 31b of casing 31 so as to form a winding or zigzag pattern. One end of each of conductive sheets 32a and 32b is connected to antenna output terminal 15a of transmitter 15, which is housed in casing 31, through lead 33.

Other arrangements are the same as those described in the above embodiment.

Figure 6:
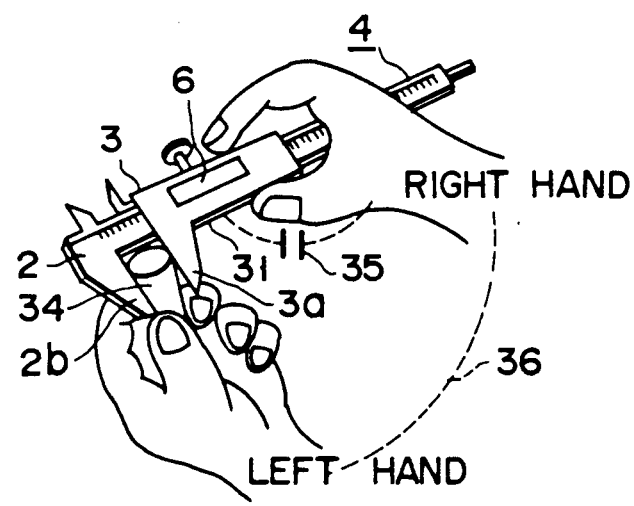
FIG. 6 is a view for explaining an operation of the measuring device having a transmitter according to the embodiment of the present invention.

When, for example, the outer diameter of small object 34 is to be measured by using such a measuring device, as shown in FIG. 6, object 34 is placed between outside jaws 2b and 3a with the operator's left hand, and slider 3 is operated with his or her right hand. When a transmission switch is operated while object 34 is properly clamped between Jaws 2b and 3a, an FSK signal of a transmission data string including measurement data is output from antenna output terminal 15a of transmitter 15 and is supplied through lead 33 to conductive sheets 32a and 32b adhered to inner upper and lower walls 31a and 31b of casing 31 in the same manner as in the above embodiment.

In this state, as shown in FIG. 6, the operator's right hand is in contact with the surface of casing 31, and the left hand is in contact with jaw 2b of metal vernier caliper section 4. As a result, casing 31 made of a dielectric material functions as equivalent coupling capacitor 35, and the body coupling the right and left hands functions as equivalent loop antenna 36. Subsequently, the FSK signal output from transmitter 15 in casing 31 flows to conductive sheets 32a and 32b adhered to the inner walls of casing 31, coupling capacitor 35, the right hand, equivalent loop antenna 36, the left hand, and jaw 2b of main scale 2 as a virtual ground.

With the above arrangement, the FSK signal including the measurement data can be efficiently radiated in the air through equivalent loop antenna 36. As a result, substantially the same effects as those described in the above embodiment can be obtained.

The present invention is not limited to the above embodiments. According to the embodiment shown in FIG. 5, conductive sheets 32a and 32b are adhered to the inner walls of casing 31. However, a PC board having a print pattern of a conductive sheet similar to conductive sheets 32a and 32b may be independently formed and arranged near the inner walls of the casing.

INDUSTRIAL APPLICABILITY

As has been described above, according to the measuring device having a transmitter according to the present invention, an antenna output terminal is connected to the inner walls of a casing, which is arranged near an operation section and incorporates the transmitter, or to a portion near the walls. Therefore, a signal output from the transmitter can be efficiently radiated in the air without independently arranging an antenna outside the casing. As a result, operability of the measuring device can be greatly increased without degrading reliability of data transmission.

We claim:

1. A measuring device having a transmitter, comprising:
   a measuring device section, including a measurement data display section, for converting measurement data into a digital value and displaying the digital value;
   a data processing unit for arranging the measurement data output from said measuring device section in a data frame having a predetermined format and outputting the measurement data as a transmission data string; and
   a FSK transmitter for FSK modulating and transmitting the transmission data string, which is output from said data processing unit, by radio transmission, the improvement comprising:
   a casing arranged on said measuring device section back to back with said measurement data display section of said measuring device section, housing said data processing unit and said FSK transmitter; and
   a conductor portion adapted to be grasped by an operator, said portion provided on at least a predetermined area of an outer rear wall of said casing, for connecting the body of the operator to said FSK transmitter whereby the body serves as a transmitting antenna.

2. A measuring device having a transmitter, comprising:

a measuring device section, including a measurement data display section, for converting measurement data into a digital value as well as displaying the digital value;

a data processing unit for arranging the measurement data output from said measuring device section in a data frame having a predetermined format and outputting the measurement data as a transmission data string; and a FSK transmitter for FSK modulating and transmitting the transmission data string, which is output from said data processing unit, by radio transmission, the improvement comprising:

a casing formed of conducting material and arranged on said measuring device section back to back with said measurement data display section of said measuring device section so as to be grasped by an operator, said casing housing said data processing unit and said FSK transmitter and connecting the body of the operator to said FSK transmitter whereby the body serves as a transmitting antenna.

* * * * *